(12) United States Patent
Haltiner, Jr. et al.

(10) Patent No.: US 8,197,982 B2
(45) Date of Patent: Jun. 12, 2012

(54) FUEL CELL WITH INTERNAL FLOW CONTROL

(75) Inventors: Karl J. Haltiner, Jr., Fairport, NY (US); Arun Venkiteswaran, Karnataka (IN)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 13/296,580

(22) Filed: Nov. 15, 2011

(65) Prior Publication Data

US 2012/0094201 A1   Apr. 19, 2012

(51) Int. Cl.
*H01M 8/00* (2006.01)
(52) U.S. Cl. ........................................ 429/471; 429/491
(58) Field of Classification Search .................. 429/471, 429/491
See application file for complete search history.

(56) References Cited

U.S. PATENT DOCUMENTS

| 6,416,899 B1 | 7/2002 | Wariishi et al. |
| 7,531,264 B2 | 5/2009 | Bai et al. |
| 2003/0104265 A1 | 6/2003 | Yoshimoto et al. |
| 2006/0147786 A1 | 7/2006 | Haltiner, Jr. et al. |
| 2010/0143763 A1 | 6/2010 | Haltiner, Jr. et al. |

OTHER PUBLICATIONS

U.S. Appl. No. 12/981,881, filed Dec. 30, 2010.

*Primary Examiner* — Jane Rhee
(74) *Attorney, Agent, or Firm* — Thomas N. Twomey

(57) ABSTRACT

A fuel cell stack is provided with a plurality of fuel cell cassettes where each fuel cell cassette has a fuel cell with an anode and cathode. The fuel cell stack includes an anode supply chimney for supplying fuel to the anode of each fuel cell cassette, an anode return chimney for removing anode exhaust from the anode of each fuel cell cassette, a cathode supply chimney for supplying oxidant to the cathode of each fuel cell cassette, and a cathode return chimney for removing cathode exhaust from the cathode of each fuel cell cassette. A first fuel cell cassette includes a flow control member disposed between the anode supply chimney and the anode return chimney or between the cathode supply chimney and the cathode return chimney such that the flow control member provides a flow restriction different from at least one other fuel cell cassettes.

20 Claims, 6 Drawing Sheets

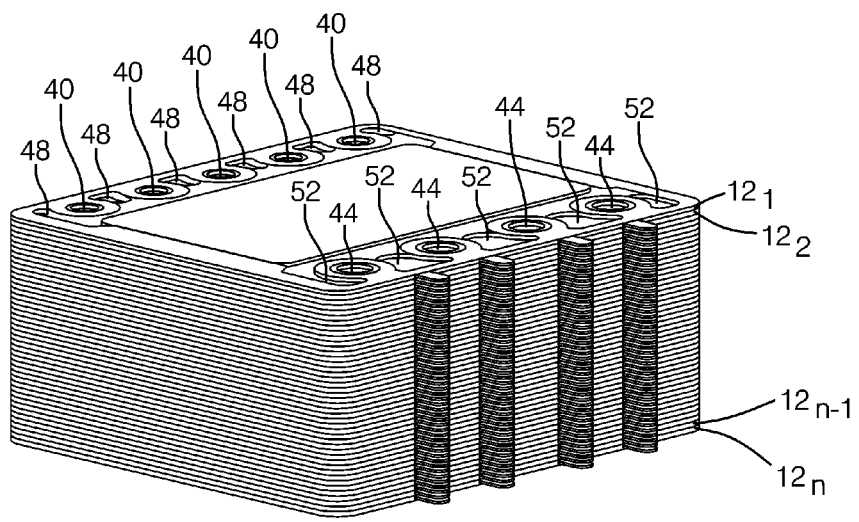
FIG. 2
PRIOR ART
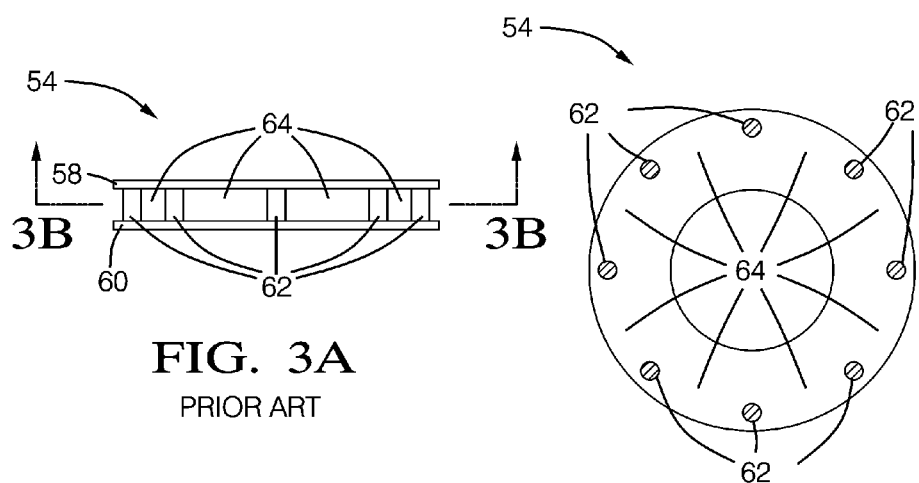
FIG. 3A
PRIOR ART
FIG. 3B
PRIOR ART

FUEL CELL WITH INTERNAL FLOW CONTROL

GOVERNMENT-SPONSERED STATEMENT

This invention was made with the United States Government support under Contract DE-NT003894 awarded by the U.S. Department of Energy. The Government has certain rights in this invention.

TECHNICAL FIELD OF INVENTION

The present invention relates to fuel cells; more particularly, to solid oxide fuel cells; and most particularly, to a mechanism for controlling the flow of an oxidant or a fuel through a solid oxide fuel cell containing a stack of fuel cell cassettes.

BACKGROUND OF INVENTION

Fuel cells are used to produce electricity when supplied with fuels containing hydrogen and an oxidant such as air. A typical fuel cell includes an ion conductive electrolyte layer sandwiched between an anode layer and a cathode layer. There are several different types of fuel cells known in the art, one of which is known as a solid oxide fuel cell or SOFC.

In a typical SOFC, air is passed over the surface of the cathode layer and a fuel containing hydrogen is passed over the surface of the anode layer opposite that of the cathode layer. Oxygen ions from the air migrate from the cathode layer through the dense electrolyte layer in which it reacts with the hydrogen and CO in the fuel, forming water and $CO_2$ and thereby creating an electrical potential between the anode layer and the cathode layer of about 1 volt.

Each individual SOFC is mounted within a metal frame, referred to in the art as a retainer, to form a cell-retainer frame assembly. The individual cell-retainer frame assembly is then joined to a metal separator plate, also known in the art as an interconnector plate, to form a fuel cell cassette. In order to produce a voltage sufficiently high to be used in variety of applications, the cassettes are stacked in series to form a fuel cell stack.

Along one side of each fuel cell cassette, between the SOFC and the outside edge of the retainer and separator plate, a plurality of anode supply passages are formed through the retainer and the separator plate. In the fuel cell stack, the plurality of anode supply passages for each fuel cell cassette together form a plurality of anode supply chimneys which allow fuel supplied at one end of the stack to be communicated to other end of the stack, thereby distributing fuel to each SOFC. The plurality of anode supply passages may be formed at regular intervals along the length of the fuel cell cassette to distribute the fuel evenly across the surface of each SOFC. Along the side opposite the side of each fuel cell cassette with the anode supply passages, between the SOFC and the outside edge of the retainer and the separator plate, a plurality of anode exhaust passages are formed through the retainer and the separator plate. In the fuel cell stack, the plurality of anode exhaust passages for each fuel cell cassette together form a plurality of anode exhaust chimneys which allow anode exhaust from each fuel cell cassette to be communicated to one end of the fuel cell stack. The plurality of anode exhaust passages may be formed at regular intervals along the length of the fuel cell cassette in the same way as the anode supply passages.

A plurality of cathode supply passages are formed through the retainer and the separator plate along the side of each fuel cell cassette which includes the plurality of anode supply passages. In the fuel cell stack, the plurality of cathode supply passages for each fuel cell cassette together form a plurality of cathode supply chimneys which allow air supplied at one end of the stack to be communicated to other end of the stack, thereby distributing air to each SOFC. The plurality of cathode supply passages may be formed at regular intervals along the length of the fuel cell cassette to distribute the fuel evenly across the surface of each SOFC such that the plurality of cathode supply passages and the plurality of anode supply passages are in an alternating pattern along the length of the fuel cell cassette. A plurality of cathode exhaust passages are formed through the retainer and the separator plate along the side of each fuel cell cassette which includes the plurality of anode exhaust passages. In the fuel cell stack, the plurality of cathode exhaust passages for each fuel cell cassette together form a plurality of cathode exhaust chimneys which allow cathode exhaust from each fuel cell cassette to be communicated to one end of the fuel cell stack. The plurality of cathode exhaust passages may be formed at regular intervals along the length of the fuel cell cassette in the same way as the cathode supply passages.

When a large number of fuel cell cassettes are stacked, it is often difficult to balance the flow of air and the flow of fuel to each cassette which results in non-uniform mass flow of air and mass flow of fuel to each cassette. This may at least partly result from the air or fuel mass flow rate and momentum being extremely high where air or fuel enters the plurality of cathode and anode supply chimneys. Air and fuel mass gets reduced as each fuel cell cassette in the fuel cell stack draws a certain mass of air and fuel. Accordingly, air/fuel mass, velocity, momentum, and kinetic energy get reduced at the end of the stack opposite the end of the fuel cell stack that receives air from an air source. Air with high kinetic energy gets less driving force to supply air to the fuel cell cassettes closer to the air source than to the fuel cell cassettes further away from the air source. Accordingly, the fuel cell cassettes closer to the air supply receive less air than the fuel cell cassettes further away from the air source, thereby providing non-uniform flow distribution between the fuel cell cassettes. This problem is more pronounced with an increase in the number of fuel cell cassettes.

One way to provide more uniform flow distribution in fuel cell stacks is shown in U.S. Pat. No. 6,416,899. In this example, a wedge is placed in the inlet and exhaust chimneys. The wedge in the inlet chimney is oriented such that the end of the inlet chimney distal from the inlet is reduced in area. The wedge in the exhaust chimney is oriented such that the end of the outlet chimney distal from the outlet is reduced in area. While this may be effective for providing a more uniform flow distribution in the fuel cell stack, the wedges decrease the chimney size and contribute to a pressure drop in the chimney. Furthermore, there are dimensional constraints on the wedge geometry and placement accuracy and variation which limit the effectiveness of this design.

Another way to provide more uniform flow distribution in fuel cell stacks is shown in United States Patent Application Publication No. US 2003/0104265. In this example, a piercing member is inserted in a passage upstream of the inlet chimneys. While this may be effective for improving the flow distribution in the fuel cells stack, the piercing member contributes to a significant pressure drop in the inlet chimneys and has limited effectiveness due to geometric constraints.

Yet another way to provide more uniform flow distribution in fuel cell stacks is shown in U.S. Pat. No. 7,531,264. In this example, first and second manifolds are provided. The first manifold supplies a gas only to the second manifold at each cassette, but does not supply gas directly to the cassettes. The second manifold supplies the gas to each of the cassettes. While this may be effective for providing a more uniform flow distribution in the fuel cell stack, flow to individual cassettes cannot be tailored and the pressure drop required to achieve uniformity is much higher than desirable.

What is needed is a fuel cell stack with more uniform flow distribution. What is also needed is such a fuel cell stack with a low pressure drop. What is also needed is such a fuel cell stack in which flow distribution to each fuel cell cassette of the fuel cell stack can be tailored.

SUMMARY OF THE INVENTION

Briefly described, a fuel cell stack is provided with a plurality of fuel cell cassettes where each fuel cell cassette has a fuel cell with an anode and cathode. The fuel cell stack includes an anode supply chimney for supplying fuel to the anode of each fuel cell cassette, an anode exhaust chimney for removing anode exhaust from the anode of each fuel cell cassette, a cathode supply chimney for supplying oxidant to the cathode of each fuel cell cassette, and a cathode exhaust chimney for removing cathode exhaust from the cathode of each fuel cell cassette. A first fuel cell cassette of the fuel cell stack includes a flow control member disposed between the anode supply chimney and the anode exhaust chimney or between the cathode supply chimney and the cathode exhaust chimney such that the flow control member provides a flow restriction different from at least one other of the fuel cell cassettes.

BRIEF DESCRIPTION OF DRAWINGS

This invention will be further described with reference to the accompanying drawings in which:

FIG. 2 is an isometric view of a prior art fuel cell stack;

FIG. 3A is an elevation view of a portion of an anode spacer of FIG. 1;

FIG. 3B is a radial cross section taken through the portion of the anode spacer of FIG. 3A.

DETAILED DESCRIPTION OF INVENTION

Figure 1:
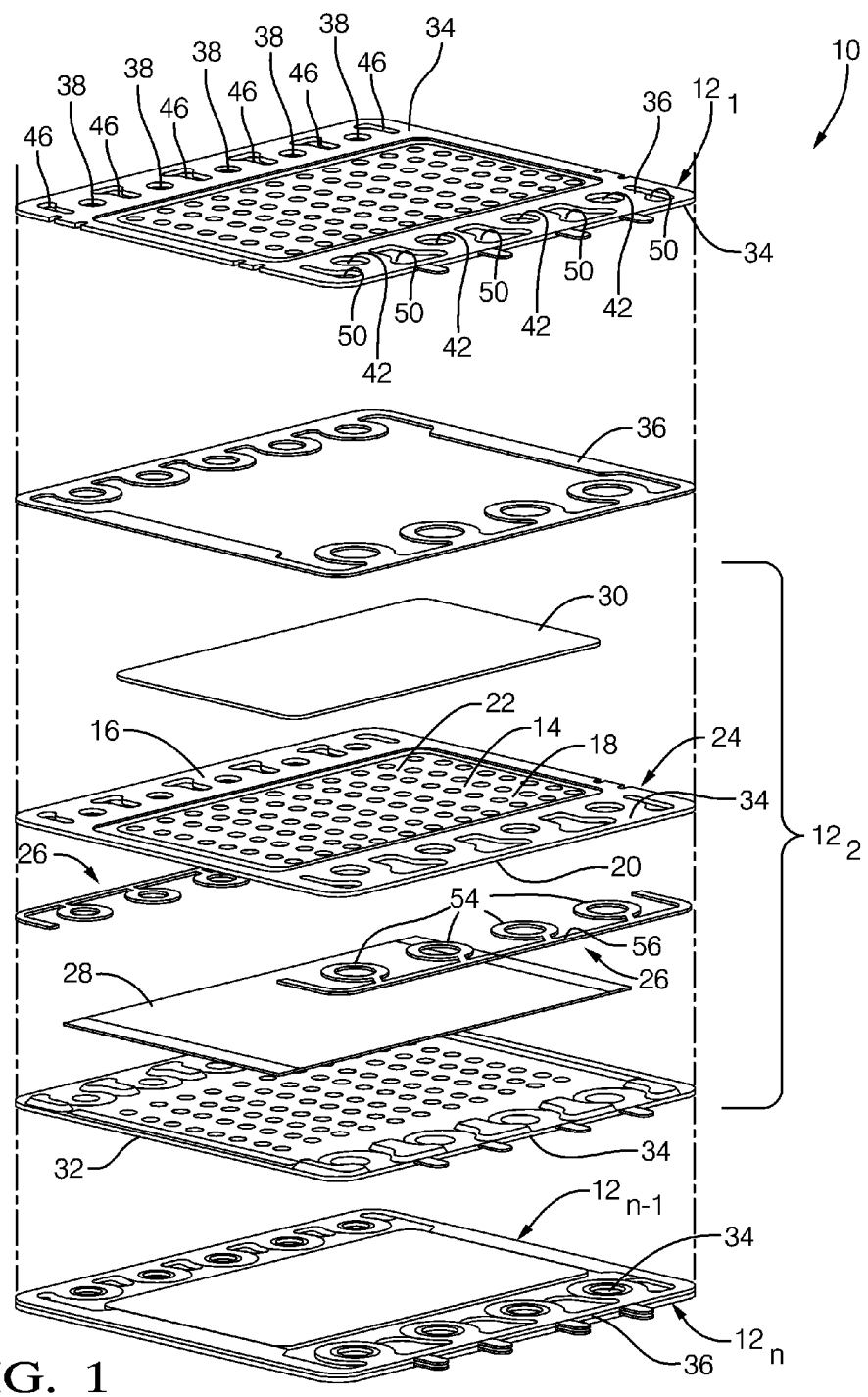
FIG. 1 is an exploded isometric view of a prior art fuel cell stack.

Referring to FIGS. 1 and 2, prior art fuel cell stack 10 includes fuel cell cassettes $12_k$, $12_2$, $12_{n-1}$, $12_n$ where n is the number of fuel cell cassettes in fuel cell stack 10 and the number of fuel cell cassettes n in fuel cell stack 10 is selected to provide a desired electrical output. Unless reference is being made to a specific fuel cell cassette, each of the fuel cell cassettes will be referred to generically as fuel cell cassette 12 from this point forward. Fuel cell cassette 12 include fuel cell 14 mounted within retainer frame 16. Fuel cell 14 includes an electrolyte layer (not shown) sandwiched between cathode layer 18 and anode layer 20. Retainer frame 16 defines a central retainer frame opening 22. Fuel cell 14 is positioned in central retainer frame opening 22 and joined to retainer frame 16 to form cell-retainer frame assembly 24. An intermediate process joins together cell-retainer frame assembly 24, anode spacers 26, anode interconnect 28, cathode interconnect 30, and separator plate 32 to form the complete fuel cell cassette 12. Fuel cell cassette 12 includes sealing surfaces 34 which are complementary to sealing surfaces 34 of the adjacent fuel cell cassette 12 to which it is joined. During assembly of fuel cell stack 10, glass composite seal 36 is disposed between sealing surfaces 34 of adjacent fuel cell cassettes 12. Glass composite seal 36 forms a bonded joint to provide a gas tight seal to separate and contain reactants and electrically isolate adjacent separator plates 32.

Still referring to FIGS. 1 and 2, fuel cell cassette 12 includes a plurality of anode supply passages 38 (for clarity, anode supply passages 38 have only been labeled on fuel cell cassette $12_1$ in FIG. 1). Anode supply passages 38 are formed along one side of fuel cell cassette 12 between fuel cell 14 and the outside edge of fuel cell cassette 12. When fuel cell cassettes $12_1$ through $12_n$ are assembled together to form fuel cell stack 10, anode supply passages 38 of each fuel cell cassette 12 are aligned with anode supply passages 38 of adjacent fuel cell cassettes 12 to form a plurality of anode supply chimneys 40. Fuel supplied at one end of fuel cell stack 10 to anode supply chimneys 40 is communicated through anode supply chimneys 40, thereby distributing fuel to each anode layer 20. Anode supply passages 38 for each fuel cell cassette 12 may be formed at regular intervals along the length of fuel cell cassette 12 to distribute fuel evenly across cathode layer 18.

Fuel cell cassette 12 also includes a plurality of anode exhaust passages 42 (for clarity, anode exhaust passages 42 have only been labeled on fuel cell cassette $12_1$ in FIG. 1). Anode exhaust passages 42 are formed along the side of fuel cell cassette 12 which is opposite to the side with anode supply passages 38. Anode exhaust passages 42 are disposed between fuel cell 14 and the outside edge of fuel cell cassette 12. When fuel cell cassettes $12_1$ through $12_n$ are assembled together to form fuel cell stack 10, anode exhaust passages 42 of each fuel cell cassette 12 are aligned with anode exhaust passages 42 of adjacent fuel cell cassettes 12 to form a plurality of anode exhaust chimneys 44. Anode exhaust chimneys 44 allow anode exhaust from each fuel cell cassette 12 to be communicated to one end of fuel cell stack 10. Anode exhaust passages 42 for each fuel cell cassette 12 may be formed at regular intervals along the length of fuel cell cassette 12 in the same way as anode supply passages 38.

Fuel cell cassette 12 also includes a plurality of cathode supply passages 46 formed along the same side of fuel cell cassette 12 as anode supply passages 38 (for clarity, cathode supply passages 46 have only been labeled on fuel cell cassette $12_1$ in FIG. 1). When fuel cell cassettes $12_1$ through $12_n$ are assembled together to form fuel cell stack 10, cathode supply passages 46 of each fuel cell cassette 12 are aligned with cathode supply passages 46 of adjacent fuel cell cassettes 12 to form a plurality of cathode supply chimneys 48. An oxidant, for example air, supplied at one end of fuel cell stack 10 to cathode supply chimneys 48 is communicated through cathode supply chimneys 48, thereby distributing air to each cathode layer 18. Cathode supply passages 46 may be formed at regular intervals along the length of fuel cell cassette 12 to distribute air evenly across cathode layer 18 such that cathode supply passages 46 and anode supply passages 38 are arranged in an alternating pattern along the length of fuel cell cassette 12.

Fuel cell cassette 12 also includes a plurality of cathode exhaust passages 50 formed along the same side of fuel cell cassette 12 as anode exhaust passages 42 (for clarity, cathode exhaust passages 50 have only been labeled on fuel cell cassette $12_1$ in FIG. 1). When fuel cell cassettes $12_1$ through $12_n$ are assembled together to form fuel cell stack 10, cathode exhaust passages 50 of each fuel cell cassette 12 are aligned with cathode exhaust passages 50 of adjacent fuel cell cassettes 12 to form a plurality of cathode exhaust chimneys 52. Cathode exhaust chimneys 52 allow cathode exhaust from each fuel cell cassette 12 to be communicated to one end of fuel cell stack 10. Cathode exhaust passages 50 for each fuel cell cassette 12 may be formed at regular intervals along the length of fuel cell cassette 12 in the same way as cathode supply passages 46 such that such that cathode exhaust passages 50 and anode exhaust passages 42 are arranged in an alternating pattern along the length of fuel cell cassette 12.

Now referring to FIGS. 1, 3A, and 3B, anode spacers 26 are disposed between retainer frame 16 and separator plate 32. Anode spacers 26 include a plurality of spacer rings 54 linked by connecting bar 56. Each spacer ring 54 includes upper spacer ring 58 and lower spacer ring 60 connected by a plurality of support columns 62. Spaces 64 formed between support columns 62 provide fluid communication from the inside of spacer ring 54 to the outside of spacer ring 54. In this way, fuel can be supplied to anode layer 20 from anode supply chimneys 40 and anode exhaust can be taken from anode layer 20 to anode exhaust chimneys 44. Anode spacers 26 are identical in all fuel cell cassettes 12, so each anode spacer 26 provides an identical flow restriction for each fuel cell cassette 12.

Figure 4:
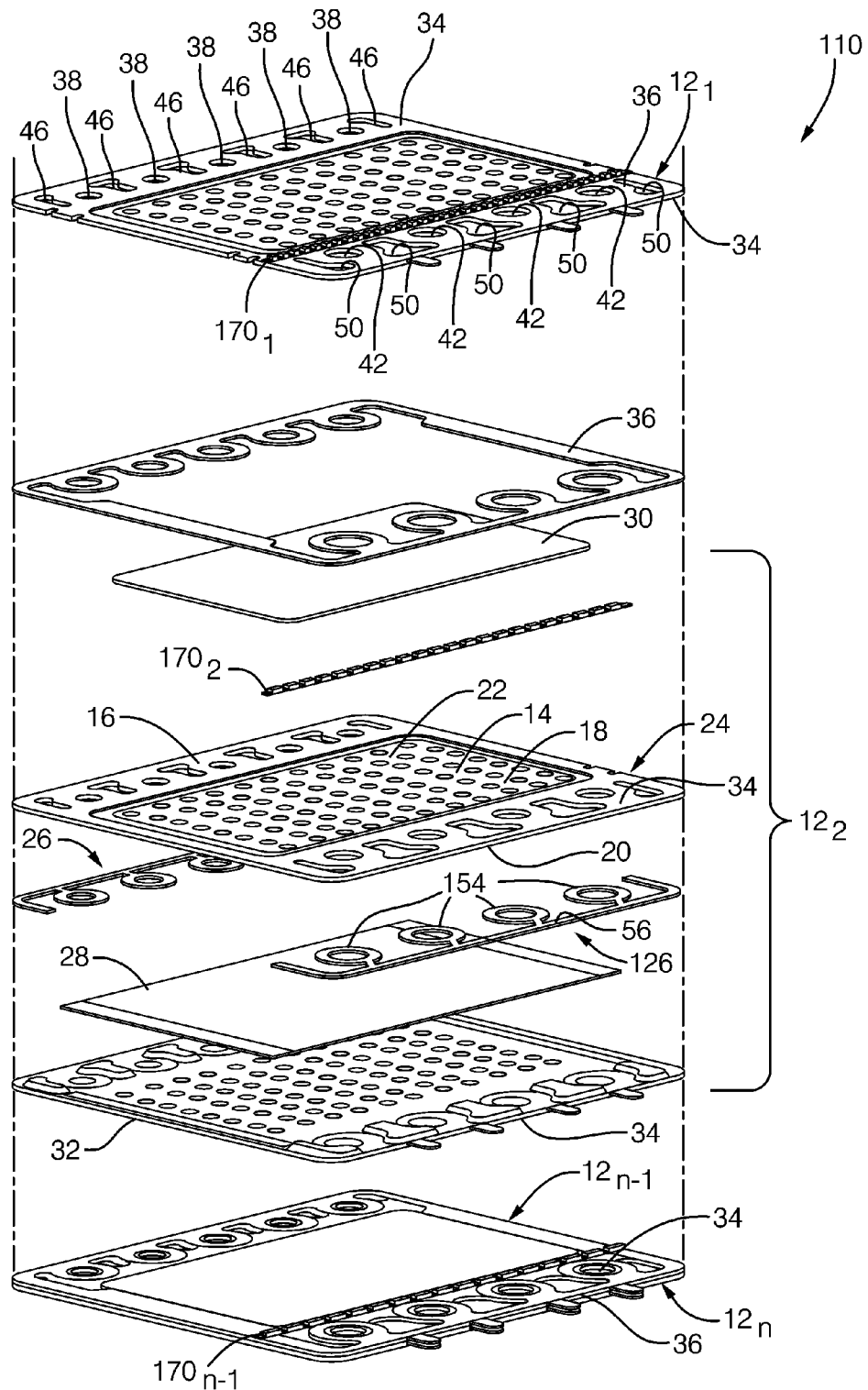
FIG. 4 is an exploded isometric view of a fuel cell stack in accordance with the present invention.

Now referring to FIG. 4, fuel cell stack 110 in accordance with the present invention is shown. Elements of fuel cell stack 110 that are the same as the elements of fuel cell stack 10 will use the same reference numbers. Fuel cell stack 110 is substantially the same as fuel cell stack 10 except for the addition of cathode flow control members $170_1$, $170_2$, and $170_{n-1}$ which are provided for fuel cell cassettes $12_1$, $12_2$, and $12_{n-1}$ respectively (cathode flow control member $170_n$ is hidden because fuel cell cassette $12_{n-1}$ is shown assembled to fuel cell cassette $12_n$ and cathode flow control member $170_n$ is disposed therebetween). Unless reference is being made to a specific cathode flow control member, each cathode flow control member will be referred to generically as cathode flow control member 170 from this point forward. Each cathode flow control member 170 provides a flow restriction to its respective fuel cell cassette 12 and each cathode flow control member 170 can be tailored to provide a predetermined flow restriction to its respective fuel cell cassette 12 that is different from the flow restriction provided to at least one other fuel cell cassette 12. Each cathode flow control member 170 may be disposed between fuel cell 14 and cathode exhaust passages 50 along the length of fuel cell cassette 12. Since each cathode flow control member 170 is disposed between fuel cell 14 and cathode exhaust passage 50, each cathode flow control member 170 is disposed between cathode supply chimneys 48 and cathode exhaust chimneys 52 such that cathode flow control members 170 do not extend into cathode exhaust passages 50. In this way, cathode flow control members 170 do not add to the pressure drop of cathode exhaust chimneys 52.

Alternatively, but not shown, each cathode flow control member 170 may be disposed between fuel cell 14 and cathode supply passages 46 along the length of fuel cell cassette 12. In this alternative, each cathode flow control member 170 remains between cathode supply chimneys 48 and cathode exhaust chimneys 52 such that cathode flow control members 170 do not extend into cathode supply passages 46. In this way, cathode flow control members 170 do not add to the pressure drop of cathode supply chimneys 48. However, this alternative may be somewhat less desirable because the air density across fuel cell 14 may be reduced due to the pressure drop across cathode flow control member 170.

Figure 5:
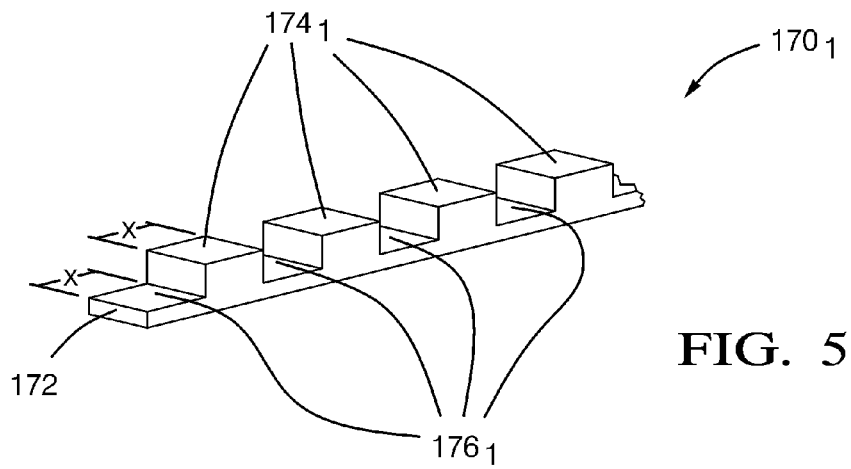
FIGS. 5-7 are isometric views of cathode flow control members of FIG. 4.
Figure 6:
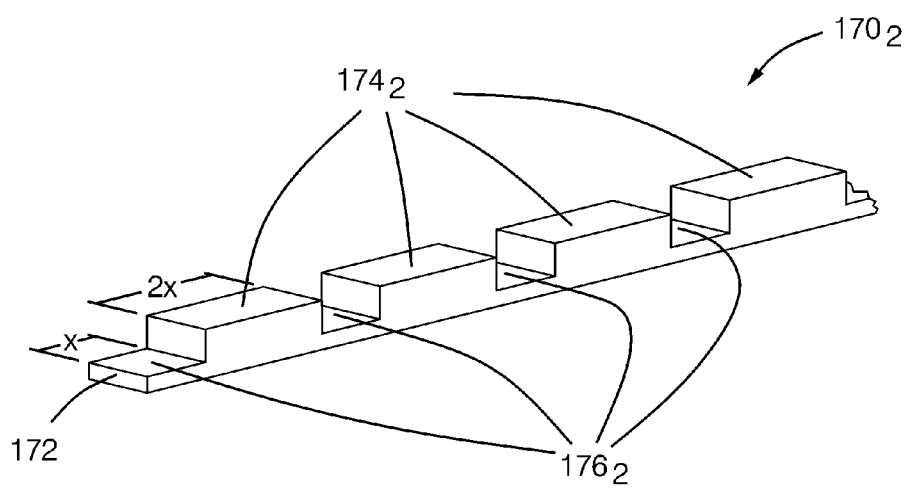
Figure 7:
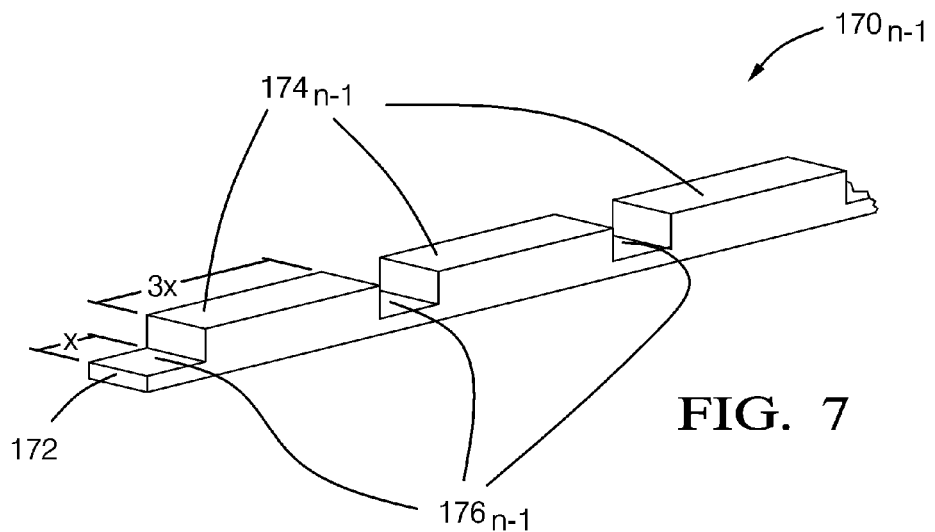

Now referring to FIGS. 5, 6, and 7, portions of cathode flow control members $170_1$, $170_2$, and $170_{n-1}$ are shown respectively to show how each flow control member may be tailored to provide a desired flow restriction to different fuel cell cassettes 12. In FIG. 5, cathode flow control member $170_1$ is shown which includes continuous bar 172 having a plurality of restriction protuberances $174_1$ extending therefrom such that one cathode flow passage $176_1$ is formed between adjacent restriction protuberances $174_1$. Preferably, restriction protuberances $172_1$ are all of equal size. Also preferably, cathode flow passages $176_1$ are all of equal size. For example purposes only, cathode flow passages $176_1$ have a width of x and restriction protuberances $172_1$ also have a width of x.

Cathode flow control members $170_2$, and $170_{n-1}$ shown in FIGS. 6 and 7 respectively are similar to cathode flow control member $170_1$. Cathode flow control member $170_2$ includes continuous bar 172 having a plurality of restriction protuberances $174_2$ extending therefrom such that one cathode flow passage $176_2$ is formed between adjacent restriction protuberances $174_2$. While cathode flow passages $176_2$ have a width x, restriction protuberances $174_2$ have a width of 2x. In this way, cathode flow control member $170_2$ is more restrictive than cathode flow control member $170_1$. Similarly, cathode flow control member $170_{n-1}$ includes continuous bar 172 having a plurality of restriction protuberances $174_{n-1}$ extending therefrom such that one cathode flow passage $176_{n-1}$ is formed between adjacent restriction protuberances $174_{n-1}$. While cathode flow passages $176_1$ have a width x, restriction protuberances $174_{n-1}$ have a width of 3x. In this way, cathode flow control member $170_3$ is even more restrictive than cathode flow control member $170_2$.

In all cases, the pressure drop required across cathode flow control members 170 to balance flow among each fuel cell cassette 12 is relatively small, for example, less than about 25% of the total pressure drop across fuel cell stack 10. In other words, the additional pressure drop to achieve balanced flow as a result of cathode flow control members 170 is small compared to a convention fuel cell stack, for example, less than about 25% increase in pressure drop.

Cathode flow control members 170 are disposed between adjacent fuel cassettes 12 so as to span the space between retainer frame 16 of one fuel cell cassette 12 and separator plate 32 of the adjacent fuel cell cassette 12. Accordingly, flow control members must not provide electrical conductivity between retainer frame 16 of one fuel cell cassette 12 and separator plate 32 of the adjacent fuel cell cassette 12. In one way of preventing electrical conductivity, cathode flow control members 170 may be made of a non-conductive material, for example, ceramic. In another way of preventing electrical conductivity, cathode flow control members 170 may be made of a conductive material, for example stamped metal or powder metal, and a non-conductive layer (not shown) such as glass may be applied between cathode flow control members 170 and retainer frame 16 and/or separator plate 32.

Referring again to FIG. 4, fuel cell stack 110 also differs from fuel cell stack 10 in that anode spacers 126, disposed on the exhaust side of fuel cell stack 10, may be tailored for each individual fuel cell cassette 12 to act as anode flow control members to provide each fuel cell cassette 12 with a desired flow restriction for fuel flow. Spacer rings 154 of anode spacers 126 are disposed between anode supply chimneys 40 and anode exhaust chimneys 44 in the same way cathode flow control members 170 are disposed between cathode supply chimneys 48 and cathode exhaust chimneys 52. Since spacer rings 154 are disposed between anode supply chimneys 40 and anode exhaust chimneys 44, spacer rings 154 do not extend into anode supply passages 38 and anode exhaust passages 42. In this way, spacer rings 154 do not do not add to the pressure drop of anode supply chimneys 40 and anode exhaust chimneys 44.

Figures 8A, 8B:
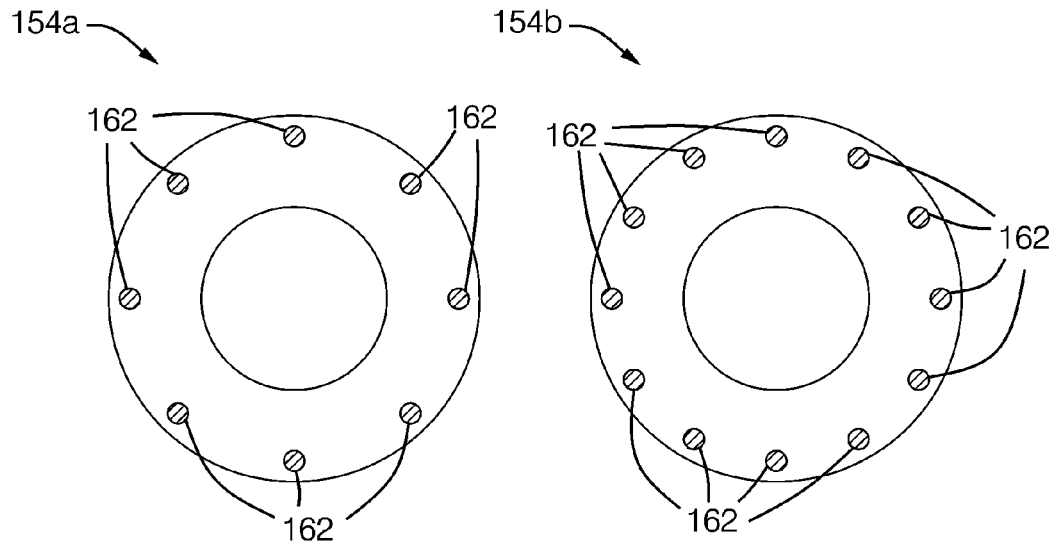
FIGS. 8A and 8B are cross-sectional views of anode flow control members.

Now referring to FIGS. 8A and 8B, one arrangement for tailoring the flow restriction of spacer rings 154 is shown. In the arrangement shown in FIG. 8A, spacer ring 154$a$ is shown with a plurality of support columns 162. Specifically, eight support columns 162 are shown which may be spaced equiangular in manner. Spacer ring 154$a$ may be used in one fuel cell cassette, for example 12$_1$, to achieve a desired flow restriction. In the arrangement shown in FIG. 8B, spacer ring 154$b$ is shown with a plurality of support columns 162. Specifically, twelve support columns 162 are shown which may be spaced equiangular in manner. In this way, spacer ring 154$b$ may be used in another fuel cell cassette, for example 12$_2$, to achieve a desired flow restriction that is different from the restriction of fuel cell cassette 12$_1$. While not shown, it should now be understood that in addition to or in the alternative of varying the number of support columns 162, the size of support columns 162 may also be varied to achieve a desired restriction.

Figures 9A, 9B:
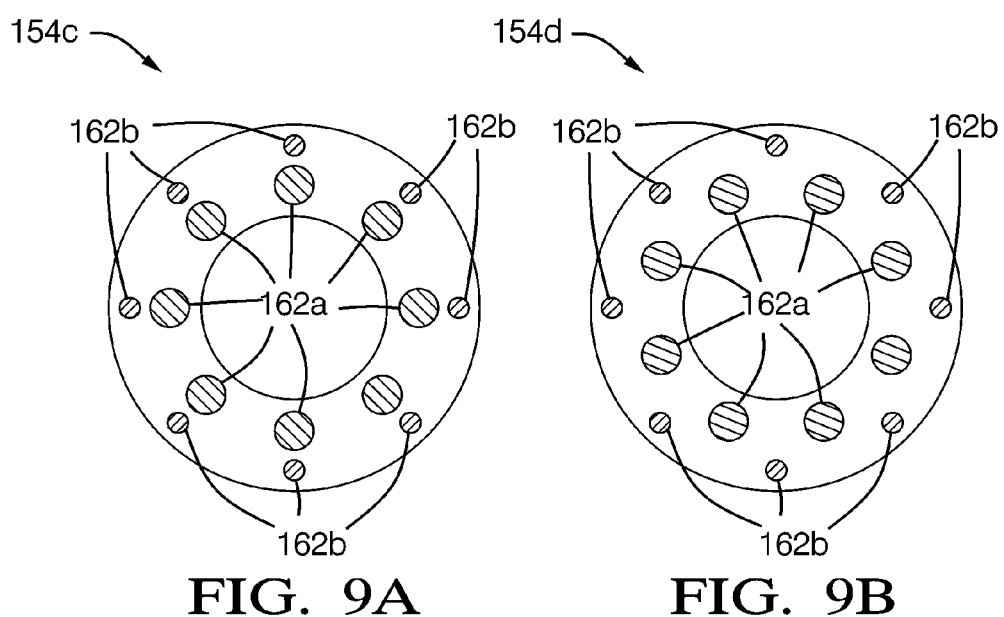
FIGS. 9A and 9B are cross-sectional views of another arrangement of anode flow control members.
Figure 9C:
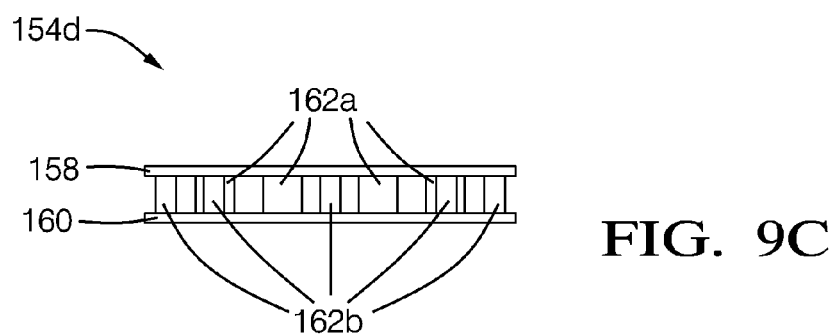
FIG. 9C is an elevation view of the anode flow control member of FIG. 9B.

Now referring to FIGS. 9A and 9B, another arrangement for tailoring the flow restriction of spacer rings 154 is shown. In the arrangement shown in FIG. 9A, spacer ring 154$c$ is shown with a plurality of inner support columns 162$a$ and a plurality of outer support columns 162$b$. Inner support columns 162$a$ are arranged to be spaced radially inward of outer support columns 162$b$, and in this example, each inner support column 162$a$ is radially aligned with one outer support column 162$b$. Spacer ring 154$c$ may be used in one fuel cell cassette, for example 12$_1$, to achieve a desired flow restriction. In the arrangement shown in FIG. 9B, spacer ring 154$d$ is shown the same as spacer ring 154$c$ except that inner support columns 162$a$ have been rotated about the center of spacer ring 154$d$ such that inner support columns 162$a$ are not radially aligned with outer support columns 162$b$ in order to increase the restriction compared to spacer ring 154$c$. The amount of rotation applied to inner support columns 162$a$ may be determined by the restriction desired to be achieved. In this way, spacer ring 154$d$ may be used in another fuel cell cassette, for example 12$_2$, to achieve a desired flow restriction that is different from the restriction of fuel cell cassette 12$_1$. While inner support columns 162$a$ are shown to be larger in diameter than outer support columns 162$b$, it should be understood that this relationship may be reversed or inner support columns 162$a$ may be the same diameter as outer support columns 162$b$. Also while not shown, it should now be understood that in addition to or in the alternative of varying relative orientation of inner support columns 162$a$ and outer support columns 162$b$, the number inner support columns 162$a$ and/or the number of outer support columns 162$b$ may be varied to achieve a desired restriction. In order to reduce the number of specific components needed to form fuel cell stack 110, inner support columns 162$a$ may be initially fixed only to upper spacer ring 158 and outer support columns 162$b$ may be initially fixed only to lower spacer ring 160. In this way, the combination of upper spacer ring 158 with inner support columns 162$a$ and the combination of lower spacer ring 160 with outer support columns 162$b$ can be used for every fuel cell cassette 12. However, upon assembly, the relative rotational orientation of upper spacer ring 158 and lower spacer ring 160 may be customized individually for each fuel cell cassette 12 to achieve a desired restriction for each fuel cell cassette 12. While not shown, the thickness upper spacer ring 158 and/or lower spacer ring 160 may be varied, thereby varying height of inner support columns 162$a$ and outer support columns 162$b$ to achieve a desired flow restriction.

Figures 10A, 10B:
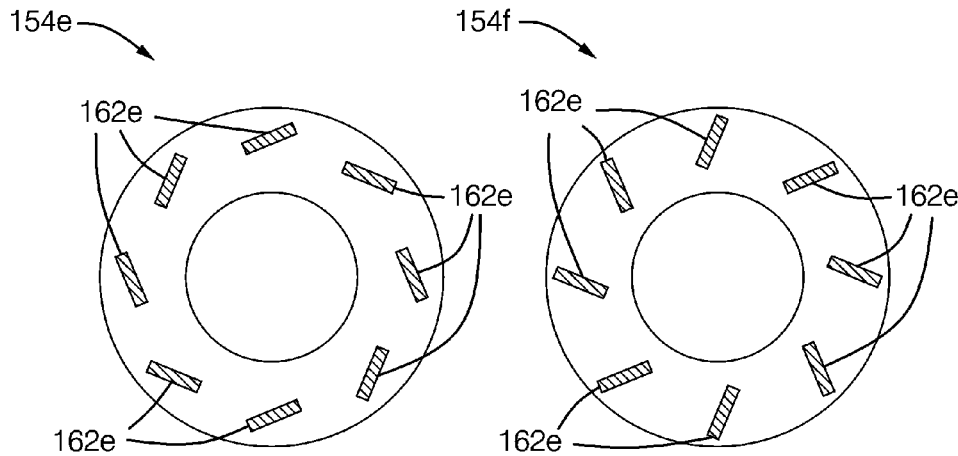
FIGS. 10A and 10B are cross-sectional views of another arrangement of anode flow control members.

Now referring to FIGS. 10A and 10B, another arrangement for tailoring the flow restriction of spacer rings 154 is shown. In the arrangement shown in FIG. 10A, spacer ring 154$e$ is shown with a plurality of support columns taking the form of vanes 162$e$. Vanes 162$e$ may have a substantially rectangular cross section and have a length greater than width. Specifically, eight vanes 162$e$ are shown which may be spaced equiangular in manner. Spacer ring 154$e$ may be used in one fuel cell cassette, for example 12$_1$, to achieve a desired flow restriction. In the arrangement shown in FIG. 10B, spacer ring 154$f$ is shown the same as spacer ring 154$e$ except that each vane 162$e$ has been rotated about its own central axis. The amount of rotation applied to each vane 162$e$ may be determined by the restriction desired to be achieved. In this way, spacer ring 154$f$ may be used in another fuel cell cassette, for example 12$_2$, to achieve a desired flow restriction that is different from the restriction of fuel cell cassette 12$_1$. While not shown, it should now be understood that in addition to or in the alternative of varying the angle of each vane 162$e$, the size of each vane 162$e$ may be varied and/or the number of vanes 162$e$ may be varied.

Figure 11A:
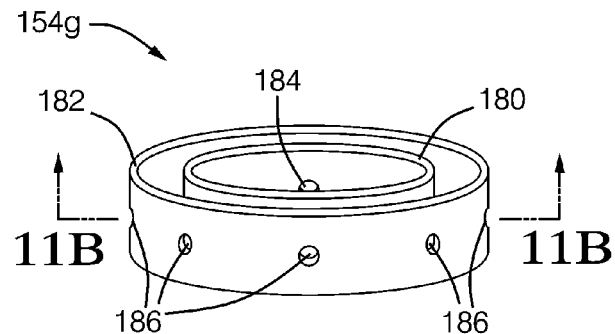
FIG. 11A is an isometric view of another anode flow control member.
Figures 11B, 11C:
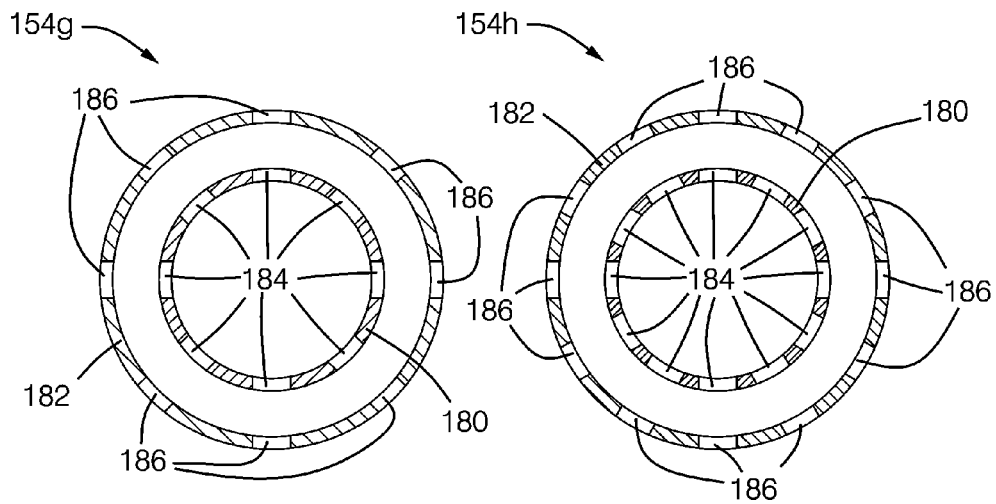
FIGS. 11B and 11C are cross-sectional views of the arrangement of anode flow control member of FIG. 11A.

Now referring to FIGS. 11A, 11B, and 11C; another arrangement for tailoring the flow restriction of spacer rings 154 is shown. In this arrangement, the spacer ring 154$g$ includes inner tube 180 and outer tube 182 which is concentric to inner tube 180. Inner tube 180 is sized to radially surround anode exhaust chimney 44. Inner tube 180 includes a plurality of inner tube flow holes 184 extending radially therethrough while outer tube 182 includes a plurality of outer tube flow holes 186 extending radially therethrough. Specifically, eight inner tube flow holes 184 are shown and eight outer tube flow holes 186 are shown, each of which may be spaced equiangular in manner. Spacer ring 154$g$ may be used in one fuel cell cassette, for example 12$_1$, to achieve a desired flow restriction. In the arrangement shown in FIG. 11C, spacer ring 154$h$ is shown the same as spacer ring 154$g$ except that spacer ring 154$h$ is shown with twelve inner tube flow holes 184 and twelve outer tube flow holes 186. In this way, spacer ring 154$h$ may be used in another fuel cell cassette, for example 12$_2$, to achieve a desired flow restriction that is different from the restriction of fuel cell cassette 12$_1$. While not shown, it should now be understood that in addition to or in the alternative of varying the number inner tube flow holes 184 and outer tube flow holes 186, the size of inner tube flow holes 184 and outer tube flow holes 186 may be varied, the number of tubes 180, 182 may be varied, and/or the radial orientation of inner tube 180 to outer tube 182 may be varied. Also while not shown, it should now be understood that a single tube may take the place of inner tube 180 and outer tube 182.

In all cases, the pressure drop across spacer rings 154 to balance flow among each fuel cell cassette 12 is relatively small, for example, less than about 25% of the total pressure drop across fuel cell stack 10. In other words, the additional pressure drop across fuel cell stack to achieve balanced flow as a result of spacer rings 154 is small compared to a convention fuel cell stack, for example, less than about 25% increase in pressure drop.

While the embodiment has been described in terms of achieving uniform flow within fuel cell stack 10, in may be advantageous to induce a desired non-uniform flow distribution. For example, the center (i.e. near fuel cell cassette $12_{n/2}$) of fuel cell stack 10 typically experiences higher temperatures than near the ends of fuel cell stack 10 (i.e. near fuel cell cassettes $12_1$ and $12_n$). Consequently, it may be desirable to reduce cathode airflow from the ends of the stack and have more cathode airflow in the cassettes toward the center of the stack because besides supplying the oxidant to fuel cell 14, the cathode airflow also serves to remove excess heat. Accordingly, cathode flow control members 170 with greater flow restriction may be placed in fuel cell cassettes 12 near the ends of fuel cell stack 10 while cathode flow control members 170 with a lesser flow restriction may be placed in fuel cell cassettes 12 near the center of fuel cell stack 10.

While not shown, it should now be understood that the specific arrangement of cathode flow control member 170 described earlier may also be applied to control the flow of fuel to anode layer 20. Similarly, it should now also be understood that the specific arrangements of spacer rings 154 acting as anode flow control members described earlier may also be applied to control the flow of oxidant to cathode layer 18.

While this invention has been described in terms of preferred embodiments thereof, it is not intended to be so limited, but rather only to the extent set forth in the claims that follow.

We claim:

1. A fuel cell stack having a plurality of fuel cell cassettes, each fuel cell cassette having a fuel cell with an anode and a cathode, said fuel cell stack comprising:
    an anode supply chimney for supplying fuel to said anode of each said fuel cell cassette;
    an anode exhaust chimney for removing anode exhaust from said anode of each said fuel cell cassette;
    a cathode supply chimney for supplying oxidant to said cathode of each said fuel cell cassette;
    a cathode exhaust chimney for removing cathode exhaust from said cathode of each said fuel cell cassette;
    wherein a first fuel cell cassette includes a flow control member disposed between said anode supply chimney and said anode exhaust chimney or between said cathode supply chimney and said cathode exhaust chimney such that said flow control member provides a flow restriction different from at least one other of said fuel cell cassettes and such that said flow control member does not restrict said anode supply chimney, said anode exhaust chimney, said cathode supply chimney, said and said cathode exhaust chimney.

2. A fuel cell stack as in claim 1, wherein said flow control member is a first cathode flow control member disposed between said cathode supply chimney and said cathode exhaust chimney and between said first fuel cell cassette and another fuel cell cassette that is adjacent to said first fuel cell cassette, said first cathode flow control member providing a first predetermined cathode flow restriction value across a first cathode.

3. A fuel cell stack as in claim 2, wherein said first cathode flow control member is electrically insulative between said first fuel cell cassette and said another fuel cell cassette that is adjacent to said first fuel cell cassette.

4. A fuel cell stack as in claim 2, wherein said first cathode flow control member includes a first bar with a first plurality of restriction protuberances extending therefrom, said first restriction protuberances being separated by a first plurality of cathode flow passages.

5. A fuel cell stack as in claim 4, wherein a second fuel cell cassette includes a second cathode flow control member disposed between said cathode supply chimney and said cathode exhaust chimney and between said second fuel cell cassette and another fuel cell cassette that is adjacent to said second fuel cell cassette, said second cathode flow control member providing a second predetermined cathode flow restriction value across a second cathode, said second predetermined cathode flow restriction value being different than said first predetermined cathode flow restriction value.

6. A fuel cell stack as in claim 5, wherein said second cathode flow control member includes a second bar with a second plurality of restriction protuberances extending therefrom, said second restriction protuberances being separated by a second plurality of cathode flow passages, wherein either said second restriction protuberances are different in size than said first restriction protuberances or said second cathode flow passages are different in size than said first cathode flow passages.

7. A fuel cell stack as in claim 2, wherein a second fuel cell cassette includes a second cathode flow control member disposed between said cathode supply chimney and said cathode exhaust chimney and between said second fuel cell cassette and another fuel cell cassette that is adjacent to said second fuel cell cassette, said second cathode flow control member providing a second predetermined cathode flow restriction value across a second cathode, said second predetermined cathode flow restriction value being different than said first predetermined cathode flow restriction value.

8. A fuel cell stack as in claim 7, wherein a third fuel cell cassette disposed between said first fuel cell cassette and said second fuel cell cassette includes a third cathode flow control member disposed between said cathode supply chimney and said cathode exhaust chimney and between said third fuel cell cassette and another fuel cell cassette that is adjacent to said second fuel cell cassette, said third cathode flow control member providing a third predetermined cathode flow restriction value across a third cathode, said third predetermined cathode flow restriction value being less than said first predetermined cathode flow restriction value and said second predetermined cathode flow restriction value.

9. A fuel cell stack as in claim 1, wherein said flow control member is a first anode flow control member disposed between said anode supply chimney and said anode exhaust chimney, said first anode flow control member providing a first predetermined anode flow restriction value across a first anode.

10. A fuel cell stack as in claim 9, wherein said first anode flow control member radially surrounds either said anode supply chimney or said anode exhaust chimney.

11. A fuel cell stack as in claim 10, wherein said first anode flow control member includes a first upper spacer ring, a first lower spacer ring coaxial with said first upper spacer ring, and a plurality of first support columns between said first upper spacer ring and said first lower spacer ring.

12. A fuel cell stack as in claim 11, wherein a second fuel cell cassette includes a second anode flow control member disposed between said anode supply chimney and said anode exhaust chimney, said second anode flow control member providing a second predetermined anode flow restriction value across a second anode, said second predetermined anode flow restriction value being different than said first predetermined anode flow restriction value.

13. A fuel cell stack as in claim 12, wherein said second anode flow control member includes a second upper spacer ring, a second lower spacer ring coaxial with said second upper spacer ring, and a second plurality of support columns between said second upper spacer ring and said second lower spacer ring wherein either the quantity of said plurality of second support columns is different than the quantity of said plurality of first support columns or the size of said second support columns is different than the size of said first support columns.

14. A fuel cell stack as claimed in claim 12, wherein said first support columns have a length greater than width, and
  wherein said second anode flow control member includes a second upper spacer ring, a second lower spacer ring coaxial with said second upper spacer ring, and a plurality of second support columns between said second upper spacer ring and said second lower spacer ring, said second support columns having a length greater than width, wherein said second support columns are radially oriented differently than said first support columns.

15. A fuel cell stack as in claim 10, wherein said first anode flow control member includes a first upper spacer ring, a first lower spacer ring coaxial with said first upper spacer ring, a plurality of first inner support columns between said first upper spacer ring and said first lower spacer ring, and a plurality of first outer support columns radially outward of said plurality of first inner support columns and between said first upper spacer ring and said first lower spacer ring, said plurality of first inner support columns defining a first angular orientation with said plurality of first outer support columns.

16. A fuel cell stack as in claim 15, wherein a second fuel cell cassette includes a second anode flow control member disposed between said anode supply chimney and said anode exhaust chimney, said second anode flow control member providing a second predetermined anode flow restriction value across a second anode, said second predetermined anode flow restriction value being different than said first predetermined anode flow restriction value.

17. A fuel cell stack as in claim 16, wherein said second anode flow control member includes a second upper spacer ring, a second lower spacer ring coaxial with said second upper spacer ring, a plurality of second inner support columns between said second upper spacer ring and said second lower spacer ring, and a plurality of second outer support columns radially outward of said plurality of second inner support columns and between said second upper spacer ring and said second lower spacer ring, said plurality of second inner support columns defining a second angular orientation with said plurality of first outer support columns, wherein said second angular orientation is different than said first angular orientation.

18. A fuel cell stack as in claim 9, wherein said first anode flow control member includes a first inner tube radially surrounding either said anode supply chimney or said anode exhaust chimney and a first outer tube radially surrounding said first inner tube, said first inner tube having a first plurality of inner tube flow holes extending radially therethrough, said first outer tube having a first plurality of outer tube flow holes extending radially therethrough.

19. A fuel cell stack as in claim 18, wherein a second fuel cell cassette includes a second anode flow control member disposed between said anode supply chimney and said anode exhaust chimney, said second anode flow control member providing a second predetermined anode flow restriction value across a second anode, said second predetermined anode flow restriction value being different than said first predetermined anode flow restriction value.

20. A fuel cell stack as in claim 19, wherein said second fuel cell cassette includes a second inner tube radially surrounding said either anode supply chimney or anode exhaust chimney and a second outer tube radially surrounding said second inner tube, said second inner tube having a second plurality of inner tube flow holes extending radially therethrough, said second outer tube having a second plurality of outer tube flow holes extending radially therethrough, wherein the quantity of said second inner tube flow holes is different than the quantity of said inner tube flow holes, the quantity of said second outer tube flow holes is different than the quantity of said first outer tube flow holes, the size of said second inner tube flow holes is different than the size of said first inner tube flow holes, or the size of said second outer tube flow holes is different than the size of said first outer tube flow holes.

* * * * *